United States Patent
Makarenko et al.

(10) Patent No.: US 6,783,271 B1
(45) Date of Patent: Aug. 31, 2004

(54) ROTARY DISPERGATOR, METHOD OF PRODUCING FOOD PRODUCTS WITH THE USE THEREOF AND FOOD PRODUCTS PRODUCED BY THIS METHOD

(75) Inventors: Vladimir Grigorievich Makarenko, Novosibirsk (RU); Mikhail Grigorievich Makarenko, Novosibirskaya oblast (RU); Sergei Petrovich Kildyashev, Novosibirsk (RU); Mikhail Stepanovich Oshurkov, Novosibirsk (RU); Sergei Alexandrovich Saushkin, Novosibirskaya oblast (RU); Anatoly Nikolaevich Parfenov, Moscow (RU)

(73) Assignee: Zakrytoe Aktsionernoe Obschestvo "Katalizatornaya Kompaniya" (RU)

( * ) Notice: Subject to any disclaimer, the term of this patent is extended or adjusted under 35 U.S.C. 154(b) by 197 days.

(21) Appl. No.: 10/049,786

(22) PCT Filed: Jul. 28, 2000

(86) PCT No.: PCT/RU00/00318

§ 371 (c)(1),
(2), (4) Date: Feb. 15, 2002

(87) PCT Pub. No.: WO01/14049

PCT Pub. Date: Mar. 1, 2001

(30) Foreign Application Priority Data

| Aug. 24, 1999 | (RU) | 99118247 |
| Aug. 24, 1999 | (RU) | 99118248 |
| Nov. 30, 1999 | (RU) | 99125320 |

(51) Int. Cl.$^7$ .......................... B01F 5/06; B02C 23/08; A23L 1/24
(52) U.S. Cl. ................. 366/171.1; 366/304; 366/181.4; 366/317; 426/629; 426/519
(58) Field of Search .......................... 366/171.1, 181.4, 366/304, 305, 306, 317; 426/629, 519

(56) References Cited

U.S. PATENT DOCUMENTS

| 3,195,867 | A | * | 7/1965 | Mould, Jr. | 366/305 |
| 3,912,236 | A | * | 10/1975 | Zipperer et al. | 366/303 |
| 4,118,796 | A | | 10/1978 | Varlamov | 366/124 |
| 4,136,971 | A | * | 1/1979 | Varlamov et al. | 366/171.1 |
| 4,201,487 | A | * | 5/1980 | Backhaus | 366/304 |
| 4,332,486 | A | * | 6/1982 | Mutalibov et al. | 366/171.1 |
| 5,590,961 | A | * | 1/1997 | Rasmussen | 366/304 |
| 6,016,798 | A | * | 1/2000 | Selivanov | 126/247 |

FOREIGN PATENT DOCUMENTS

| EP | 0210448 | 2/1987 |
| GB | 1538392 | 1/1979 |
| JP | 4-46544 | 7/1992 |
| JP | 2727200 | 3/1998 |
| RU | 2030883 | 3/1995 |
| RU | 2081692 | 6/1997 |
| RU | 2104650 | 2/1998 |
| SU | 331811 | 4/1972 |
| SU | 1000000 | 2/1983 |
| SU | 1068094 | 1/1984 |
| SU | 1205878 | 1/1986 |
| SU | 1824227 | 6/1993 |
| WO | 80/00798 | 5/1980 |

* cited by examiner

Primary Examiner—Tony G. Soohoo
(74) Attorney, Agent, or Firm—Ostrolenk, Faber, Gerb & Soffen, LLP

(57) ABSTRACT

A rotary dispergator comprises a rotor (4) set on a shaft (5) of a stator (2) having a coaxial row of teeth (7) and an outer concentric row of straightening blades (8), encompassing the rotor (4) from the outside, the width of radial cuts between the straightening blades (8) of the stator (2) being several times smaller than their length. The rotor (4) has an impeller comprised of straight or curved blades (10), as well as a coaxial row of blades (11). A method of producing food products consists in that with the help of the dispergator a mechano-acoustic effect with an intensity of 100–500 W/kg of product is produced on the material to be comminuted placed into a container. With the use of rotary dispergator, various food products based on a vegetable material are produced: a soybean paste, a mayonnaise.

12 Claims, 1 Drawing Sheet

ROTARY DISPERGATOR, METHOD OF PRODUCING FOOD PRODUCTS WITH THE USE THEREOF AND FOOD PRODUCTS PRODUCED BY THIS METHOD

FIELD OF THE ART

The present invention relates to equipment and methods for producing food products of different viscosity: mayonnaise, pastes, pate, and more particularly it relates to a rotary dispergator, to a method of producing food products with the use thereof, and to food products produced by this method.

BACKGROUND OF THE INVENTION

Food products produced from vegetable materials, such as soybeans, possess valuable nutritive properties. Various methods of preparing products containing vegetable protein and equipment for carrying these methods into effect have been proposed for preserving and improving the nutritive properties of such products.

Vegetable materials are noted for a high cohesion between their particles. Therefore producing food products from such materials involves a problem of uniform distribution of the material particles when mixing them with other components. The size of vegetable material particles should not exceed 15–20 $\mu$m. When producing products from soybeans, in addition to thorough dispergation, conditions should be provided for riding of both the unpleasant odor of the starting vegetable material and the trypsin inhibitor contained therein.

At present various methods are used for producing food products from vegetable materials, using special equipment or equipment operating at elevated pressures and temperatures. However, these methods require considerable outlays.

Various techniques are employed for riding of the unpleasant odor and the trypsin inhibitor from food products with soybean protein. In JP Application No. 4-46544 M, C1. A23L1/120, A23C11/10, 1992 soybeans are crushed, triturated and heated at <90° C. with the help of a device generating mechanical shear forces; the trypsin inhibitor becomes deactivated.

It is also proposed that preliminarily steeped soybeans should be milled, and for riding of the "bean" taste, a suspension of soybeans should be exposed to microwave radiation (RU 2030883, IPC A23L1/20, A23LC11/10, 1995), and, upon boiling, kept for 30–35 min.

For producing a soybean sauce with high taste properties (Application JP No. 2727200, IPC A23L1/238, 1998), starch stock is heated at an elevated pressure in a screw extruder with the shaft power preset in accordance with a definite formula.

In a known method of producing sauce pastes (SU Inventor's Certificate No. 1068094, A23L1/24, 1982) as a filler and emulsifier use is made of a paste from vegetables or fruit preliminarily comminuted and treated with live steam under a pressure of 0.5–0.7 gage atmosphere, in an amount of 34–36%. The paste thus produced is mixed in a definite sequence and at definite temperatures with other required components and, in the final step, homogenized.

These methods are disadvantageous in view of a low emulsifying capacity of proteins and a relative complexity of the process equipment employed, as well as because of necessity of treating the stock material with live steam under a pressure.

For producing mayonnaise with a uniform distribution of vegetable stock particles, a colloidal mill is used, in which soybeans are comminuted after preliminary steeping in a solution of common salt and cooking thereof (Inventor's Certificate SU No. 1205878, IPC A23L1/24, 1983). Then the resulting mass is mixed at definite temperatures with and in a definite sequence with egg powder, salt, sugar, mustard, vegetable oil, acid, and homogenized in the final step.

For lowering the activity of tripsyn inhibitor down to a level acceptable for food products, it is necessary to treat soybeans with live steam for 10–15 minutes at a temperature of 130° C. and pressure of 0.6–0.7 gage atmosphere or to cook them in water for a long period of time (up to 60 minutes as this method contemplates). After such treatment, like in the case with the above-described methods, a considerable part of soybean proteins is denaturated, as a result of which their ability to form thick, stable gels becomes lost and their emulsifying ability reduces. Egg powder could not be excluded from the mayonnaise formulae according to this method, and therefore these mayonnaises contain cholesterol.

A soya milk production method is known (RU 2104650, IPC A23C 11/10, A23L 1/20, 1998), wherein swollen soybeans are fed to a grinder-emulsifier (the rotation speed of its knives being 4000 rpm), and hot water having a temperature of 95–97° C. is supplied simultaneously to a double crushing zone. The simultaneous process of crushing and hydrothermal treatment is carried out for 3–5 min. The finished product is passed through a cooler.

This method is disadvantageous in that the process is complicated and thick pastes cannot be produced thereby.

A number of rotary dispergators are known in the art (SU No. 331811, IPC B01F 11/02, 1972; RU No. 2081692, IPC B01F 7/282, 1997; SU No. 1824227, IPC B01F 7/28, 1993; U.S. Pat. No. 4,118,796, IPC B01F11/02, 1978; U.S. Pat. No. 4,1369,71, IPC B01F11/02, 07/28, 1979; WO 80/00798, IPC B01F11/02, 1980), which comprise a rotor and a stator having various design differences and which make it possible with the help of an acoustic field to effect dispergation and homogenization by treating media with different properties. For instance, a rotary apparatus (Inventor's Certificate SU No. 1824227, IPC B01F7/28, 1993) comprises a rotor made as a disk with radial blades and a stator with a set of coaxial cylinders with cuts arranged at an acute angle to the direction of rotation of the rotor, each cylinder of the stator being provided with an additional cylinder with cuts, arranged with a clearance with respect to the stator, the cuts of the additional cylinders being displaced and inclined away from the main cylinders.

However, all the above-cited rotary dispergation apparatus are effective only when intermixing particles preliminarily ground down to a size smaller than 0.5 mm; in the case of larger (greater than 0.5 mm) solid inclusions in the working liquid medium the dispergation process becomes very long. Besides, large lumps often tightly clog the rotor, close the cuts, the flow of liquid through them ceases, so that the dispergation process stops completely.

In the known method of processing vegetable food stock material (Inventor's Certificate SU No. 1000000, IPC A23C11/00, 1983) an emitter of high-frequency acoustic oscillations is used, which generates 8–10 kHz oscillations with an intensity of about 1.5 W/cm$^2$. The stock material being processed is mixed with water and constitutes a homogeneous suspension, microbes being destroyed simultaneously. To make processing with high-frequency oscillations more intensive, an excess pressure of 3–4 atm is set up in the closed medium. At these frequency and intensity of acoustic oscillations, the required residence time of the stock particles in the emitter zone is 2–5 min. For increasing the degree of homogeneity of the suspension, mixing is continued in additional baths.

A two-stage preliminary grinding of the stock material is used in this method. Nevertheless, the method does not enable producing thick pastes with a viscosity greater than 10 Pa·s (with shear velocity of 3 s$^{-1}$)

So, there is a need in providing an effective equipment and new methods for producing food products from vegetable materials, which will be free from the disadvantages inherent in the equipment and methods known heretofore.

DISCLOSURE OF THE INVENTION

The main object of the claimed invention is to provide an effective rotary dispergator for processing materials of different viscosity and having solid inclusions, and also to provide a method of preparing food products with high gustatory properties, using such dispergator.

Said object is accomplished by that for producing food products from a vegetable material it is proposed to use a rotary dispergator having definite design features, as described in claims 1–8, which make it possible to subject materials being processed to a prescribed mechano-acoustic effect with a required intensity.

Other solved problems and the advantages of the present invention will be relieved below in a brief description of the accompanying drawings, in the best embodiments of the invention.

The proposed rotary dispergator comprises a stationary secured stator and a rotor coaxial therewith, brought in rotation by a shaft.

The stator is a disk with a central inlet opening disposed from below, and a coaxial row of teeth. For improving the effectiveness of dispergation, the stator teeth have relieving along the inner surface at an angle of 0 to 15° to a tangent of the cylinder. The stator further has an outer concentric row of straightening blades, which encompasses the rotor from the outside. The teeth and blades of the stator are defined by radial cuts in cylinders, the width of the cuts between the straightening blades being at least two times smaller than their length.

Such design of the stator insures damping of the rotational component of the velocity of liquid outgoing from the dispergator. Owing to this, it becomes possible to avoid an elevated pressure along the container periphery and a strong curvature of the free surface of liquid, dangerous in view of a possibility of critical lowering of the liquid level near the dispergator. Furthermore, when the dispergator operates, liquid enters it only from below. This rules out the possibility of formation of a paraxial eddy and air entrainment into the dispergator, and makes it possible to reduce foam formation and stabilize the power consumption irrespective of the level of liquid. All these features in combination insure the same and time-stable conditions of treating the medium irrespective of the level to which the container is filled.

The rotor is a solid disk fitted onto a shaft and having an impeller comprised of straight or curved blades and a concentric row of blades defined by the cuts in the cylinder, the impeller and the blades facing downward, this feature together with the stator design insuring the advantages described above. The blades of the impeller of the rotor are either straight and disposed at an angle to the radial plane of the dispergator, not exceeding 90°, or curved. The impeller creates a hydrodynamic head, rotates and presses the material being comminuted to the planing teeth of the stator. Thereby active circulation and high rate of initial comminution are insured. An outer row of the rotor blades is disposed radially at an angle not exceeding 60° to the radial plane of the dispergator. The disposition of the impeller blades and the rotor blades at an angle to the radial plane makes it possible to reduce the power consumption of the dispergator, while preserving its high effectiveness. The impeller with the blades and the rotor blades may be made detachable to facilitate their replacement in the case of wear.

The stator and the rotor are mounted coaxially. The teeth of the stator are disposed between the impeller and blades of the rotor, and the blades of the rotor are disposed between the teeth and straightening blades of the stator.

For creating a variable sonic frequency pressure in the medium and improving the material treatment conditions, the size and periodicity of the stator teeth and rotor blades disposition are such that as the rotor rotates, the radial flow of the medium should periodically be completely closed.

The radial clearance between the teeth of the stator and the blades of the rotor does not exceed simultaneously 0.5 mm and 10% of the minimum width of the rotor cuts; the clearances between the stator teeth and the impeller do not exceed two thirds of the minimum width of the cuts. The observance of the first requirement insures a high amplitude of the created pressure variations and a high quality of dispergation; the observance of the second requirement rules out the possibility of clogging the dispergator with large pieces of the stock material.

The stator and the rotor are made detachable for insuring their replacement in the case of wear during long-time service.

These design features make it possible, when processing vegetable material, to produce a high mechano-acoustic effect on the material being processed. Along with mechaical comminution and high-temperature treatment, superposition of a variable pressure onto the material of biological origin speeds up the process of cell destruction and extraction of cell components into solution. As a result, high-quality food products can be produced.

Moreover, the rotary dispergator serves as a highly efficient tool in preparing various suspensions, emulsions and solutions. It may also be used as a reliable and powerful audio-signal generator when carrying out various technological processes in liquids with superposition of a sonic field.

The rotary dispergator is suitable for use as an immersion-type apparatus inside reservoirs, since it does not impart rotation to the liquid owing to the presence of straightening blades, this insuring absence of excess pressure over the reservoir periphery, as well as constancy of the mixture treatment conditions and of the dispergator power consumption. Moreover, compared with the known solutions, this rotor dispergator provides a better dispersity of the treated material both in a flowing medium and in a reservoir.

It is just the use of the proposed rotary dispergator that intensifies the dispergation processes and makes it possible to load starting components, e.g., whole soybeans.

A method of producing food products on the basis of a vegetable material, namely, soybeans, using the proposed rotary dispergator, is described in more detail below.

The method differs from those known in the art by the simplicity of the process flowsheet.

The prepared stock material is charged into a container provided with a heating or cooling jacket, and the above-described rotor dispergator, which makes it possible to treat the stock material with a mechano-acoustic effect having an intensity of 100–500 W/kg, is placed therein. Depending on the dispergator design, the acoustic field frequency is 2–6 kHz.

The components are charged successively, in conformity with the technology of preparing products. The rotary dispergator is arranged in different places inside the container (from above, from below, on one side).

After charging the starting components into the container, the rotary dispergator is switched on, and the liquid medium with the solid components enters the hollow interior of the rotor. Solid inclusions are pressed by the centrifugal force and by the blades to the stator and intensively planed off by the stator teeth, whereby a preliminary comminution of the material is achieved. The angles formed due to relieving make the stator operate like a file, reliably and quickly comminuting the material being treated, said material, being entrained by the liquid medium, passes through the cuts and is subjected in a stream to acoustic treatment. The treated material leaves the rotary dispergator and enters the container again.

Very stable emulsions or suspensions from most diverse components are thus produced during a short period of time.

The proposed method makes it possible, in accordance with a simple process flowsheet, by varying the treatment conditions: heat application to the container, cooling and varying the time and intensity of treating the components of the circulating mixture passed through the rotary dispergating apparatus, varying the rotation speed of the rotor, to obtain products having different density with uniformly distributed disperse particles.

So, under the effect of the rotary dispergator, a water-soybean or other mixture circulates in the container, passing repeatedly through the rotary dispergator and being comminuted on the working members of the rotary dispergator and in the acoustic field generated by it. When more complicated products should be produced, other required components are added gradually to the circulating mixture.

The proposed rotary dispergator for producing food products from soybeans makes it possible to obtain material having a more loose structure (less coherent product), in mixing which with other components a smaller amount of power is required and a more homogeneous and higher-quality product is obtained, the nutritive value of the products being increased.

In accordance with the proposed method a soybean paste has been produced, homogenized and deodorized in an aqueous medium with the help of the rotary dispergator which insures mechano-acoustic effect with an intensity of 100–500 W/kg of product with the particle size smaller than 15 µm at a temperature of 70–100° C. till obtaining a plastic mass with the soybean content in the paste of from 5 to 25% on conversion to dry matter.

The produced soybean paste is noted for stability against stratification, high gustatory properties, does not contain anti-nutrients. On the basis of this paste various food products are prepared, for instance, a mayonnaise with flavor and aromatic additives in an amount of 0.01–2.0% by weight, with the soybean content in the mayonnaise of 3–21% by weight (on conversion to dry matter). The mayonnaise composition, in percent by weight, is as follows:

| | |
|---|---|
| Vegetable oil | 15–40 |
| Soybean | 3–21 |
| Granulated sugar | 1.6–4.2 |
| Prepared mustard | 2.5–3.7 |
| Common salt | 0.9–1.0 |
| 6% edible acid | 2.4–2.7 |
| (acetic, citric, tartaric or apple acid) | |
| Preservative (sodium benzoate) | 0.01–0.1 |
| Drinking water | the balance |

The proposed mayonnaise composition is cholesterol-free, because egg powder, dried milk, and any other products of animal origin are not used for preparing it.

The method of preparing mayonnaise comprises the steps of intermixing a paste based on soybeans and water with flavor additives, introducing a vegetable oil and an edible acid, and homogenization, all the steps of producing mayonnaise being carried out in a mixing container provided with a jacket wherein a rotary dispergator is located. The emulsifier is a soybean paste in an amount of 3–21% by weight on conversion to dry matter. Other components are then introduced to obtain a mayonnaise having the above-cited composition.

So, in contradistinction to the known solutions, it is just the use of a rotary dispergator for producing food products from a vegetable material, which insures a mechano-acoustic effect with an intensity of 100–500 W/kg of product, that leads to solving the set problem and makes it possible to shorten the product preparing process, to save stock materials, to completely rule out the use of egg powder and dried milk in the preparation of mayonnaise, to manufacture a low-calorie mayonnaise with an increased content of soybean protein, to reduce the number of technological steps in the preparation of food products.

THE BEST EMBODIMENTS OF THE INVENTION

Figure 1:
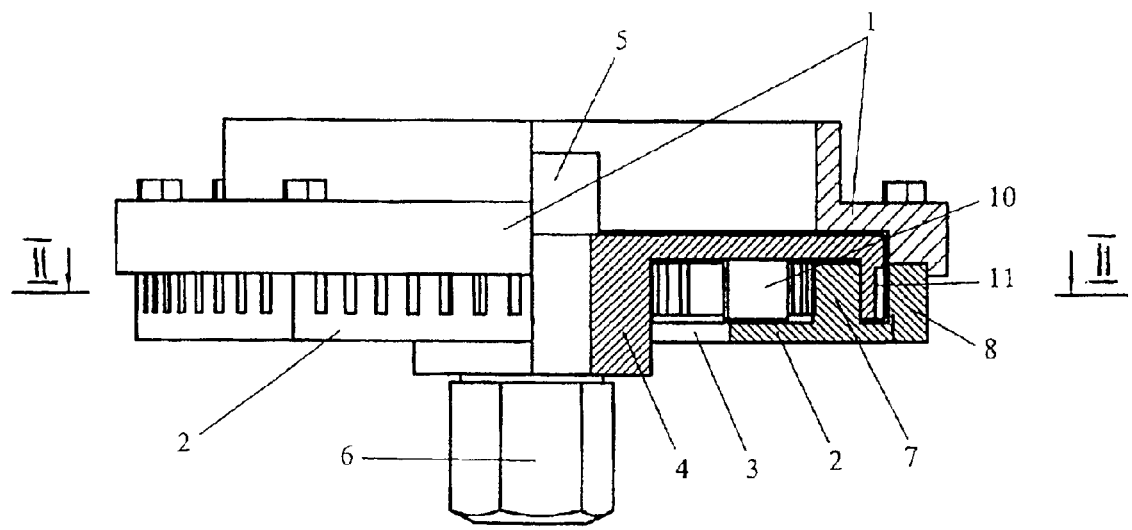
FIG. 1 shows a partial section of the rotary dispergator according to the invention.
Figure 2:
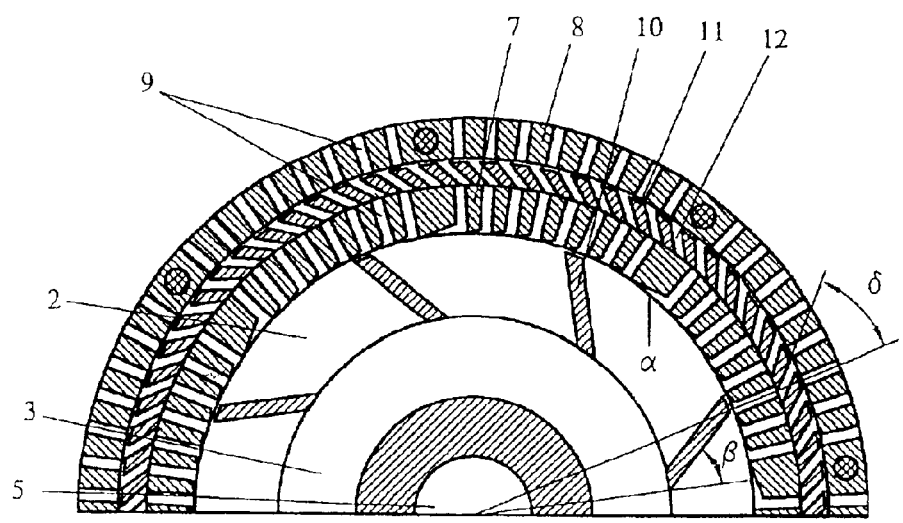
FIG. 2 shows a section taken along II—II in FIG. 1.

A rotary dispergator shown in FIGS. 1, 2 comprises a stationary casing 1, a stator 2 having a central inlet opening 3 facing downwards, and a rotating rotor 4 set on a shaft 5 and secured on said shaft with a nut 6.

The stator 2 is secured on the stationary casing 1 and has coaxial rows of teeth 7 and straightening blades 8. The teeth 7 and blades 8 of the stator 2 are defined by radial cuts 9 in cylinders; the width of the cuts between the straightening blades 8 should be at least 2 times smaller than their length. The teeth 7 of the stator 2 have relieving along the inner surface at an angle of 15° to a tangent to the cylinder.

The rotor 4 is a disk on which there are an impeller comprised of straight or curved blades 10 installed at an angle β of not over 90° to the radius and a coaxial row of blades 11. The blades are defined by radial cuts 12 in the cylinder. The cuts are made at an angle δ not exceeding 60°. The impeller and teeth of the rotor may be made detachable.

The radial clearance between the teeth 7 of the stator 2 and the blades 11 of the rotor 4 does not exceed simultaneously 0.5 mm and 10% of the minimum width of the cuts 9 and 12; the clearances between the teeth 7 of the stator 2 and the impeller with blades 10 of the rotor 4 do not exceed two thirds of the minimum width of the radial cuts 9 and 12. The teeth 7 of the stator and the blades 11 of the rotor 4 are made such that as the rotor rotates, the radial flow of the medium should periodically be completely closed, thereby a variable sonic frequency pressure being set up in the medium.

The proposed rotary dispergator may be made as an immersion-type or flow-type apparatus.

The rotary dispergator made as an apparatus immersible into a container operates in the following manner. A liquid medium to be treated, containing solid inclusions (polymer grains, wood chips, plant seeds, etc.) is fed through the inlet opening 3 of the stator 2 to the hollow interior of the rotor 4. Solid inclusions are pressed by the centrifugal force and by the blades 10 to the stator and are intensively planed off by the teeth 7, whereby a preliminary comminution of the material is achieved. The relieving angle a makes the stator 2 operate like a file, reliably and quickly comminuting the material being treated, said material, being entrained by the liquid medium, passes through the cuts 9 and 12, being subjected in a stream to additional mechanical and acoustic treatment. At the dispergator outlet, the medium has only a radial velocity component, this feature insuring stable operation of the dispergator in containers, irrespective of the level of liquid above it. Since the medium is supplied only from below and no eddy is formed, excessive foaming may also be obviated.

The rotary dispergator employed for producing food products is simple in service and methods for producing products are also simple technologically.

The preparation of a soybean paste with the use of the rotary dispergator according to the invention is carried out in the following manner: hulled or unhulled soybeans, preliminarily steeped in cold water, taken in an amount on conversion to dry matter, necessary to produce the required mass of finished product, are boiled. Then the soybeans are placed in a container and water is added thereto. A rotary dispergator is arranged inside the container. Under the action of the rotary dispergator which produces a mechano-acoustic effect with an intensity of 100–500 W/kg of product, the water-soybean mixture circulates in the container, passing repeatedly through the rotary dispergator and being comminuted on the working members of the rotary dispergator and in the acoustic field generated by it. The attained pressure and temperature insure deodorization and inactivation of the anti-nutrients in the soybeans. In this way the operations of deodorizing and comminuting soybeans down to micron-size particles, mixing them with water, heating and homogenizing the treated mixture are performed in one container simultaneously, yielding a plastic edible water-soybean paste, stable against stratification and having a prescribed viscosity.

The water-soybean paste is prepared with the soybean content in water of from 5 to 25% (on conversion to dry matter) at a temperature of up to 130° C. during a period of time from 5 to 40 minutes.

The resulting soybean paste may be used for preparing various food products.

For preparing a soybean mayonnaise, the produced paste is cooled, mustard, salt and sugar are added to it, the mixture is stirred in the same container with the help of the rotary dispergator, and then a vegetable oil and an edible acid are added to the mixture, as well as flavor and aromatic additives, depending on the mayonnaise brand.

For a better understanding of the present invention, the following particular examples of embodying thereof are presented below.

In its particular embodiment, the rotary dispergator for producing food products had the following characteristics:

The width of radial cuts between the straightening blades 8 of the stator 2 is one third of their length. The teeth 7 of the stator 2 have a relieving along the inner surface at an angle of 15° to a tangent to the cylinder. The clearance between the impeller 10 of the rotor 4 and the teeth of the stator was equal to one third of the minimum width of the radial cuts in the stator 2. The blades of the impeller 10 had an angle to the radius $\beta=45°$. The outer row of the blades 11 of the rotor 4 is =disposed at an angle to the radius $\delta=45°$. The radial clearance between the teeth 7 of the stator 2 and the blades 11 of the rotor 4 was 0.1 mm The clearance between the blades 11 of the rotor 4 and the blades 8 of the stator 2 was one third of the width of the radial cuts in the stator 2.

EXAMPLE 1

Producing Soybean Paste

Hulled or unhulled soybeans, preliminarily steeped in cold water and taken in an amount on conversion to dry matter, necessary to produce the required mass of finished product, were cooked for 15 minutes, charged into a container provided with a jacket, and then a rotary dispergator is switched on, under the effect of which the water-soybean mixture circulates in the container, passing repeatedly through the dispergator and being comminuted.

A water-soybean paste was prepared with the soybean content in water of 14% by weight (for dry matter) at a temperature of $\geq 70°$ C. and atmospheric pressure. The treatment intensity was 300–500 W/kg, the treatment time was about 20 minutes. The produced soybean paste may be used for preparing various products. The size of particles in the soybean paste is smaller than 15 $\mu$m.

EXAMPLE 2–4

A soybean paste is prepared as in Example 1, except that the kind and content of the vegetable stock material, as well as the treatment conditions were varied. The composition and conditions of preparing the soybean paste are presented in Table 1.

| Example No. | Stock material | Soybean content on conversion to dry matter, percent by weight | Treatment temperature, ° C. | Treatment time, min. |
|---|---|---|---|---|
| 1 | Cooked soybeans | 14 | $\geq 70$ | $\geq 10$ |
| 2 | Cooked soybeans | 25 | $\geq 70$ | $\geq 15$ |
| 3 | Groats grist | 16 | 90–95 | 30 |
| 4 | Soybean oil cake | 5 | 90–95 | 30 |

EXAMPLE 5

Method of Producing Mayonnaise

Added to a water-soybean paste at the temperature of 35° C. are a prepared mustard, salt and sugar, which are intermixed with the paste by means of a rotary dispergator.

A vegetable oil was introduced into the resulting mass, and a stable oil-and-water emulsion with 5 $\mu$m oil droplets was obtained under the effect of the working members of the rotary dispergator, lasting 1–3 minutes. The treatment intensity was 150–250 W/kg of product, depending on the level to which the container was filled.

Then a solution of acetic, citric or other edible acid was poured into the container, and the mixture was homogenized with the help of the rotary dispergator. Before unloading the target product from the container, said product was additionally cooled down to a temperature below 20° C., using a cooling jacket for this purpose. Before packaging, the target product was evacuated. The formulation and properties of the mayonnaise are given in Table 2.

EXAMPLE 6–7

Mayonnaise was produced as in Example 5, the only difference being that the percentage of the soybean paste and vegetable oil was varied.

EXAMPLE 8–13

Mayonnaise was produced as in Example 5, the only difference being that flavor and aromatic additives and their percentage were varied.

Industrial Applicability

The proposed rotary dispergator is intended for predominant use in the foodstuffs industry, and may also be successfully used in different technological processes where intensive intermixing, homogenization, and the preparation of emulsions are required, for instance, in the chemical industry, in the manufacture of paints and varnishes, and in the manufacture of perfumes.

TABLE 2

| | "Table Gourmet", % by weight | | | "Sandwich Gourmet", % by weight | "Nut Gourmet", % by weight | "Mustard Gourmet", % by weight | "Mushroom Gourmet", % by weight | "Spiced Gourmet", % by weight | "Dessert Gourmet", % by weight |
|---|---|---|---|---|---|---|---|---|---|
| | \multicolumn{9}{c}{Example No.} | | | | | | | | |
| | 5 | 6 | 7 | 8 | 9 | 10 | 11 | 12 | 13 |
| Vegetable oil | 20 | 40 | 15 | 15 | 20 | 20 | 20 | 20 | 20 |
| Dry egg powder | — | — | — | — | — | — | — | — | — |
| Groats paste | — | — | — | — | — | — | — | — | — |
| Dry soybeans | 14 | 3 | 21 | 16 | 14 | 14 | 14 | 14 | 15 |
| Sugar | 1.8 | 4.2 | 1.6 | 1.8 | 1.6 | 1.8 | 1.8 | 1.8 | 4.2 |
| Salt | 0.9 | 1.0 | 0.9 | 0.9 | 0.9 | 1.0 | 0.9 | 1.0 | 0.9 |
| Dry mustard | 3.3 | 3.3 | 3.3 | 3.4 | 3.3 | 3.7 | 3.3 | 3.5 | 2.5 |
| Prepared mustard | | | | | | | | | |
| Dried defatted milk | — | — | — | — | — | — | — | — | — |
| 80% acetic acid | — | — | — | — | — | — | — | — | — |
| 6% acetic acid | 2.4 | 2.4 | | 2.4 | 2.4 | 2.7 | 2.4 | 2.4 | 2.4 |
| Flavor and aromatic additives | — | — | — | 0.03 | 0.03 | 0.02 | 0.1 | 0.03 | 2.0 |
| Preservative | 0.1 | 0.1 | 0.1 | 0.1 | 0.1 | 0.1 | 0.1 | 0.1 | 0.1 |
| Drinking water | 57.5 | 60.1 | 49.0 | 55.4 | 57.8 | 56.7 | 57.4 | 57.2 | 54.9 |
| Energy value, kcal/100 g | 234 | 284 | 245 | 243 | 234 | 234 | 234 | 234 | 249 |
| Stability of emulsion, minimum percentage of undisturbed emulsion | 98 | 97 | 99 | 97 | 98 | 99 | 98 | 99 | 98 |

What is claimed:

1. A rotary dispergator comprising a stator (2) having an inlet opening (3), a coaxial cylinder with teeth (7) defined by cuts (9) therein, and a rotor (4) which is made as a disk with blades (11) defined by cuts (12) in the cylinder and is brought in rotation with the help of a shaft (5), characterized in that installed additionally on the rotor (4) is an impeller comprised of straight or curved blades (10), and the stator (2) additionally has an outer concentric row of straightening blades (8) defined by the cuts (9) in the outer coaxial cylinder which encompasses the rotor (4) from the outside, the width of the radial cuts (9) between the straightening blades of the stator being at least two times smaller than their length for stabilizing the mechano-acoustic effect produced on the product being processed.

2. A rotary dispergator according to claim 1, characterized in that the teeth (7) of the stator (2) have a relieving along the inner surface at an angle to a tangent to the cylinder not exceeding 15°.

3. A rotary dispergator according to claim 1, characterized in that the blades (10) of the impeller are disposed an angle to the radial plane of the dispergator, not exceeding 90°.

4. A rotary dispergator according to claim 1, characterized in that the outer row of the rotor blades (11) is disposed at an angle to the radial plane of the dispergator, not exceeding 60°.

5. A rotary dispergator according to claim 1, characterized in that the radial clearance between the teeth (7) of the stator (2) and the blades (11) of the rotor (4) does not exceed 0.5 mm.

6. A rotary dispergator according to claim 1, characterized in that the radial clearance between the teeth (7) of the stator (2) and the blades (11) of the rotor (4) is not over 10% of the minimum width of the cuts (9) of the rotor and of the stator).

7. A rotary dispergator according to claim 1, characterized in that the radial clearance between the teeth (7) of the stator (2) and the impeller of the rotor does not exceed two thirds of the minimum width of the radial cuts.

8. A rotary dispergator according to claim 1, characterized in that the teeth (7) of the stator and the blades (11) of the rotor are made such that, as the rotor rotates, the radial flow of the medium should periodically be completely closed.

9. A method of producing food products on the basis of a vegetable material, for instance, mayonnaise, emulsions, soya milk, pastes, comprising the steps of comminuting, intermixing, homogenization and heat treatment of the starting components, characterized in that all the steps are carried out in a container with a jacket for a running medium with the use of a rotary dispergator according to claim 1, with the help of which a mechano-acoustic effect with an intensity of 100–500 W/kg of product is produced in said container.

10. A soybean paste which comprises a soybean-containing product, water and is homogenized, characterized in that it is produced by a method according to claim 9 with the help of a rotary dispergator under a mechano-acoustic effect at a temperature of up to 130° C. and soybean content of from 5 to 25% on conversion to dry matter.

11. A mayonnaise comprising an emulsifier, a thickener and a protein-enriching agent in the form of a soybean paste, a vegetable oil, sugar, salt, mustard, an edible salt (6%)and water, characterized in that the mayonnaise comprises a soybean paste in an amount of 3–21% on conversion to dry matter, produced according to claim 10 with the help of a rotary dispergator, and said mayonnaise further comprises a preservative with the following ratio of the components, in percent by weight:

| | |
|---|---|
| Vegetable oil | 15–40 |
| Soybean paste (on conversion to dry matter) | 3–21 |
| Sugar | 1.6–4.2 |
| Salt | 0.9–1.0 |
| Mustard | 2.5–3.7 |
| Edible acid | 2.4–2.7 |
| Preservative | 0.01–0.1 |
| Water | the balance. |

12. A mayonnaise according to claim 11, characterized in that it further comprises flavor and aromatic additives in an amount of 0.01–2.0 percent by weight.

* * * * *

UNITED STATES PATENT AND TRADEMARK OFFICE
CERTIFICATE OF CORRECTION

PATENT NO. : 6,783,271 B1
DATED : August 31, 2004
INVENTOR(S) : Makarenko et al.

It is certified that error appears in the above-identified patent and that said Letters Patent is hereby corrected as shown below:

Title page,
Item [73], Assignee, should read -- Zakrytoe Aktsionernoe Obschestvo "Kholdingovaya Katalizatornaya Kompania" (RU) --.

Signed and Sealed this

Twentieth Day of September, 2005

JON W. DUDAS
*Director of the United States Patent and Trademark Office*